United States Patent [19]
Briggs

[11] Patent Number: 5,926,346
[45] Date of Patent: Jul. 20, 1999

[54] DISK DRIVE BARRIERS THAT RESTRAIN MOVEMENT OF THE DRIVE ACTUATOR

[75] Inventor: John C. Briggs, Layton, Utah

[73] Assignee: Iomega Corporation, Roy, Utah

[21] Appl. No.: 08/866,227

[22] Filed: May 30, 1997

[51] Int. Cl.⁶ .............................. G11B 5/54; G11B 21/22
[52] U.S. Cl. ........................................................ 360/105
[58] Field of Search ................................. 360/104, 105, 360/106, 107, 109

[56] References Cited

U.S. PATENT DOCUMENTS

| | | | |
|---|---|---|---|
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,289,325 | 2/1994 | Morehouse et al. | 360/105 |
| 5,291,359 | 3/1994 | Wolter | 360/104 |
| 5,508,864 | 4/1996 | Briggs et al. | 360/106 |
| 5,530,607 | 6/1996 | Spendlove | 360/105 |

*Primary Examiner*—George J. Letscher
*Attorney, Agent, or Firm*—Woodcock Washburn Kurtz MacKiewicz & Norris LLP

[57] ABSTRACT

An actuator for carrying a read/write head into engagement with a surface of a recording medium includes a carriage assembly including a load beam upon which the read/write head is mounted, and a pair of barriers disposed on opposite sides of the load beam to constrain lateral movement of the load beam to prevent damage to the read/write head when the disk drive undergoes shock. Extending from the load beam may be a pair of wings that ride upon ramped surfaces that are, disposed within the disk drive, as the actuator moves to engage and disengage a data storage medium. Preferably, the barriers are disposed outboard of the wings, so that the wings will contact the barriers and thereby restrain movement of the actuator when a mechanical shock is applied to the disk drive. By restraining movement of the actuator, the barriers protect the heads from mechanical shock.

10 Claims, 9 Drawing Sheets

DISK DRIVE BARRIERS THAT RESTRAIN MOVEMENT OF THE DRIVE ACTUATOR

RELATED APPLICATIONS

The present application is related to the following patent applications, all of which are hereby incorporated by reference in their entirety:

Ser. No. 08/866,189, filed on May 30, 1997, entitled "An Improved Operating System For Operating An Eject System And A Head Retraction System Of A Disk Drive" (Attorney Docket No. 9460)

Ser. No. 08/881,804, filed on May 30, 1997, entitled "Media Capture to Prevent Head Damage In A Removable Cartridge Disk Drive" (Attorney Docket No. 9463)

Ser. No. 08/866,205, filed on May 30, 1997, entitled "An Improved Head Retraction System for Retracting The Heads Of A Disk Drive" (Attorney Docket No. 9464)

Ser. No. 08/881,803, filed on May 30, 1997, entitled "Steering Magnets To Reduce Magnetic Leakage Flux In A Disk Drive" (Attorney Docket No. 9507)

Ser. No. 08/881,805, filed on May 30, 1997, entitled "Laminated Steel Return Path With Actuator Support Features" (Attorney Docket No. 9508)

Ser. No. 08/866,190, filed on May 30, 1997, entitled "Dual Loop Flex Circuit For A Linear Actuator" (Attorney Docket No. 9509)

Ser. No. 08/872,712, filed on May 30, 1997, entitled "Interlocking Carriage Assembly For Linear Actuator" (Attorney Docket No. 9511)

Ser. No. 08/881,806, filed on May 30, 1997, entitled "Head Gimbal Protection For A Disk Drive" (Attorney Docket No. 9512)

Ser. No. 08/866,168, filed on May 30, 1997, entitled "Flexured Mounting System For Friction Reduction And Friction Linearization In Linear Actuator For Disk Drive" (Attorney Docket No. IOM-9514)

Ser. No. 08/881,807, filed on May 30, 1997, entitled "Return Path Geometry to Enhance Uniformity Of Force On A Linear Actuator" (Attorney Docket No. 9516)

Ser. No. 08/866,180, filed on May 30, 1997, entitled "In-Rigger For A Linear Actuator Carriage Assembly" (Attorney Docket No. 9517)

Ser. No. 08/866,227, filed on May 30, 1997, entitled "Integral Lift Wing For A Disk Drive Actuator" (Attorney Docket No. 9518)

Ser. No. 08/866,167, filed on May 30, 1997, entitled "Self-Positioning Lever For Opening The Shutter of A Removable Disk Cartridge" (Attorney Docket No. 9525)

Ser. No. 08/866,177 filed on May 30, 1997, entitled "Motor Loading System For A Disk Drive" (Attorney Docket No. 9526)

Ser. No. 08/866,226, filed on May 30, 1997, entitled "An Improved Eject System For Ejecting A Disk Cartridge From A Disk Drive" (Attorney Docket No. 9527)

Ser. No. 08/881,808, filed on May 30, 1997, entitled "Cover For A Disk Drive" (Attorney Docket No. 9547)

BACKGROUND

1. Field of the Invention

The present invention relates to computer storage devices, such as disk drives, and, more particularly, to apparatus for loading and unloading the read/write heads of a disk drive onto, and off of, a rotating storage medium, and for protecting the read/writes heads from damage due to shock and, in the case of removable cartridge disk drives, from damage that might result during media insertion.

2. Description of the Prior Art

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems. Various aspects and features of the present invention address and overcome several of these problems.

In particular, the ZIP™ drive employs a pair of opposing read/write heads for recording and reproducing information on both sides of the storage medium within a ZIP™ disk. The opposing read/write heads are disposed on flexible load beams at the distal ends of respective actuator arms, that allow the heads to fly closely over the respective surfaces of the rotating disk. In presently available internal and external versions of the ZIP™ drive, loading/unloading ramps are employed to spread the read/write heads apart as the head actuator is moved to a retracted position, in which the heads are moved back away from the edge of the storage medium. This process is described, for example, in commonly assigned, co-pending patent application Ser. No. 08/324, 895, filed Oct. 18 , 1994, entitled "Head LoadlTnload and Cleaning in a Data Storage Device" As disclosed therein, wings attached to the load beams of the actuator ride on opposed ramps fixedly disposed in the drive, as the carriage of the linear actuator moves toward and away from the disk.

As the heads move toward the disk, the wings ride down the opposed ramps, bringing the heads together onto the disk in a controlled manner. As the linear actuator is withdrawn away from the disk, the wings ride up the opposed ramps to again separate the heads. In this retracted position, disk cartridges can be inserted and removed from the disk drive without harming the read/write heads, since they are retracted backwardly a sufficient distance from the edge of the disk cartridge media. U.S. Pat. No. 4,663,683 (McNeil) discloses another structure in which wings attached to load beam members ride upon ramped surfaces, or cams, to move the read/write heads of a disk drive onto, and off of, a rotating storage medium. In the actuator disclosed in U.S. Pat. No. 4,663,683, as well as in commonly assigned U.S. Pat. No. 5,530,607, the wings are separate components that must be assembled, or attached, to the load beams during disk drive manufacture.

Because a version of the ZIP™ drive to be used in laptop and notebook computers is preferably only 135 mm in length, and because the size of the ZIP™ cartridge is already established, there will not be enough room in such a drive to be able to retract the heads completely away from the storage medium. As a result, there is a need for a means of protecting the heads during insertion and withdrawal of a disk cartridge. Additionally, vertical size constraints increase the potential for the read/write heads to be damaged when the disk drive undergoes a shock or extreme vibration, as can occur during the handling of a laptop or notebook computer. Various novel and inventive aspects of the present invention address these problems. Also, due to the size constraints and the relative complexity of disk drive devices, there is a need to simplify assembly processes and to reduce the number of parts of disk drives. Other aspects of the present invention satisfy this need.

SUMMARY OF THE INVENTION

The present invention is directed to apparatus for loading and unloading the read/write heads of a disk drive onto, and off of, a rotating storage medium, and for protecting the read/writes heads from damage due to shock and, in the case of removable cartridge disk drives, from damage that might result during media insertion.

According to one aspect of the present invention, an actuator for carrying the read/write head(s) of the disk drive into engagement with a storage medium comprises a carriage assembly that has a load beam upon which the read/write head is mounted, a wing extending from the load beam and being formed integrally therewith, and a ramped surface on which the wing rides to position the read/write head on the surface of the storage medium. By forming the wing integrally with the load beam, the number of parts of the drive is reduced, resulting in a cost reduction. Additionally, the disk drive assembly process is simplified, as the step of attaching a separate wing to each load beam, as is done in the prior art, is eliminated.

According to another aspect of the present invention, a pair of opposed projections are disposed adjacent the read/write head(s) of a disk drive, when the heads are in a retracted position. The opposed projections have opposed angled surfaces that deflect and capture the edge of the storage medium within a disk cartridge, during insertion of the cartridge into the drive, to prevent the edge of the storage medium from damaging the read/write heads. In the preferred embodiment, the opposed projections are formed as part of a load ramp member that includes ramped surfaces along which the integral wings of the load beams of the actuator ride. In one embodiment, the load ramp member has a pair of opposed snaps extending from the side of the member opposite the opposed projections. A core of the load ramp member is hollowed to form a flexible hinge, whereby pressure exerted on the opposed projections causes the pair of opposed snaps to spread apart to facilitate attachment and detachment of the load ramp member to and from other structure within the disk drive.

According to yet another aspect of the present invention, a pair of barriers are disposed on opposite sides of the load beam(s) of the disk drive actuator to constrain lateral movement of the load beam(s) to prevent damage to the read/write head(s) when the disk drive undergoes shock in the lateral direction. In a preferred embodiment, each barrier is disposed adjacent a respective one of the ends of the wing(s) on the load beam(s) of the actuator, and operate to constrain lateral movement of the wings. Also in the preferred embodiment, the barriers are formed as part of the load ramp member mentioned above, and in particular, may be formed as part of the opposed projections that deflect and capture the storage medium.

According to still another aspect of the present invention, a carriage assembly of the disk drive actuator comprises a load beam having a tab extending distally from its distal end, a gimbal having a proximal end connected to the distal end of the load beam, and having a flexure upon which a read/write head is attached, and a restraining member at the distal end of the gimbal through which the tab of the load beam extends. The restraining member contacts the tab when the carriage assembly undergoes shock along a vertical axis, to prevent excessive movement of the gimbal in that direction.

These and other features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings.

DETAILED DESCRIPTION OF THE PREFERRED EMBODIMENTS

Figure 1:
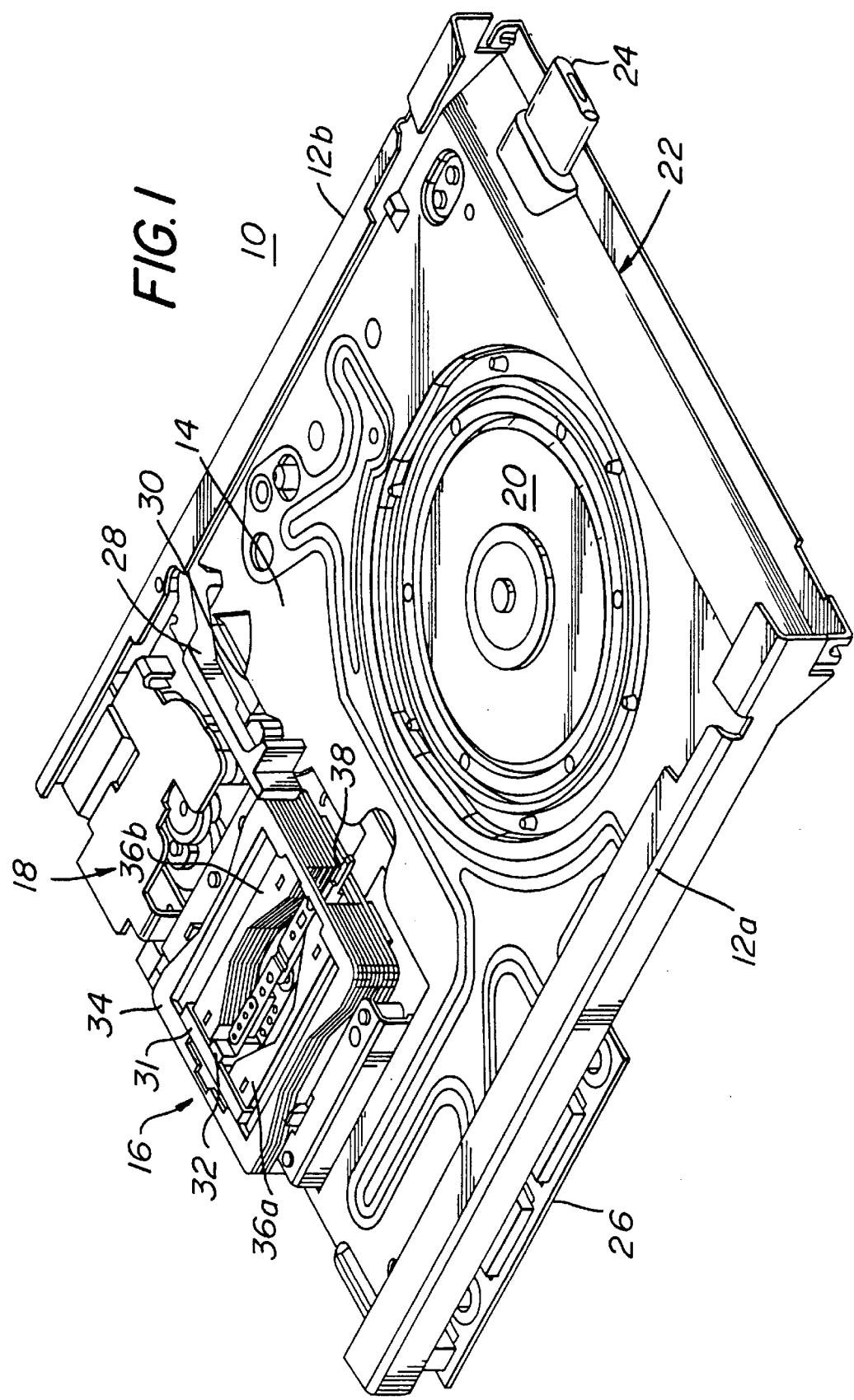
FIG. 1 shows an exemplary disk drive in which the features of the present invention may be employed.

Referring to the drawings wherein like numerals indicate like elements throughout, there is shown in FIG. 1 an exemplary disk drive 10 in which the present invention may be employed. The disk drive 10 comprises a chassis 14 having u-shaped outer edges that form opposed guide rails 12a, 12b that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted. In the position shown in FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a voice coil motor including a coil 31 mounted on a carriage assembly 32, an outer magnet return path assembly 34, and two inner return path members 36a, 36b on opposite sides of the carriage assembly 32. After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 2:
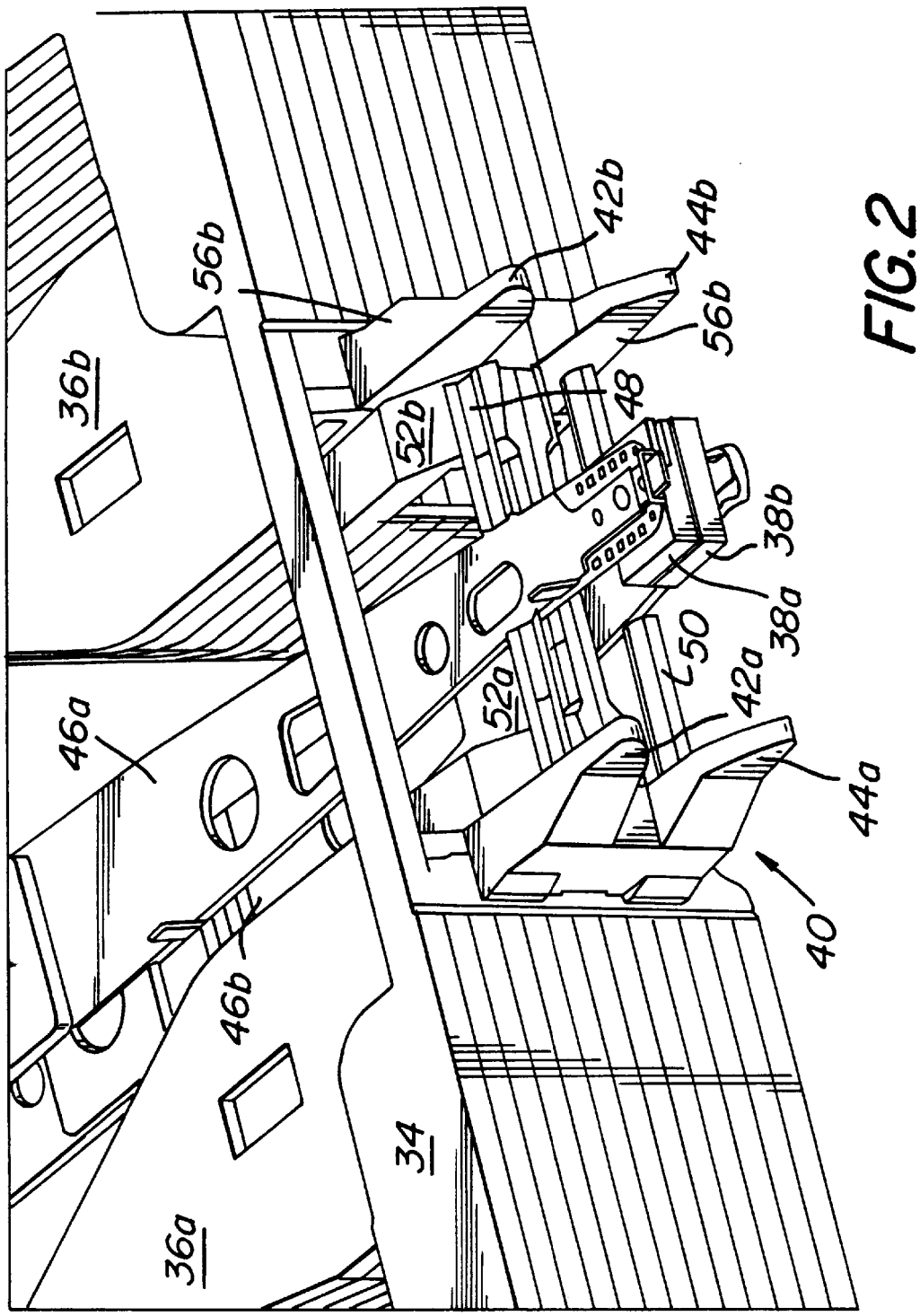
FIG. 2 is an enlarged perspective view of a portion of the disk drive of FIG. 1, showing a load ramp member in accordance with the present invention.
Figure 3A:
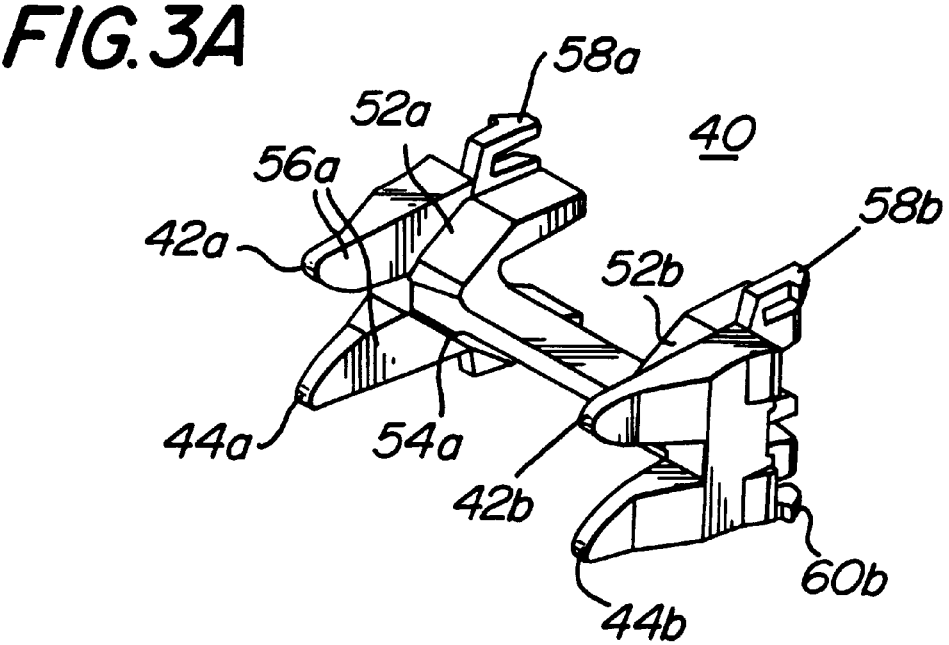
FIGS. 3A and 3B show front and rear perspective views, respectively, of the load ramp member of FIG. 2.
Figure 3B:
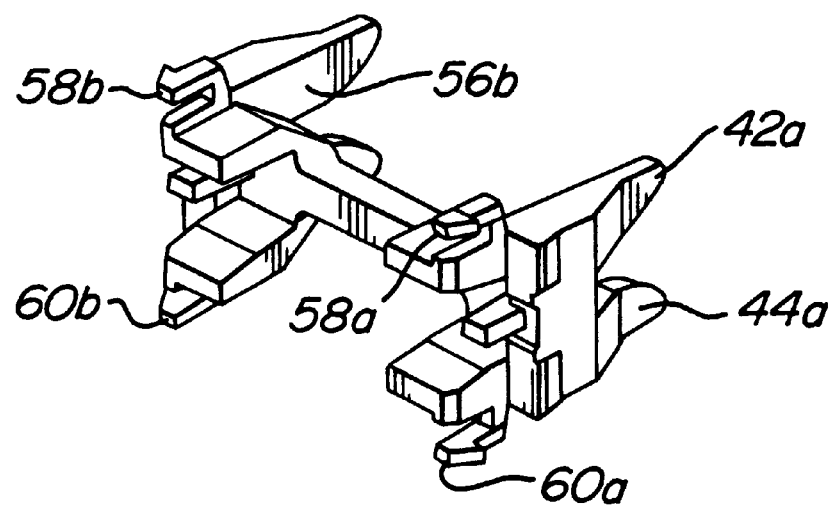
Figure 4A:
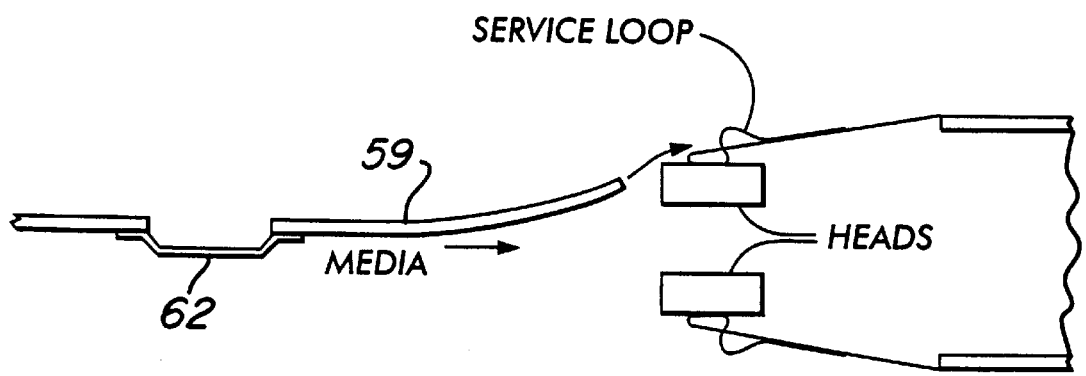
FIG. 4A is a pictorial representation of the problem that arises when the edge of a storage medium is offset vertically during disk cartridge insertion.
Figure 4B:
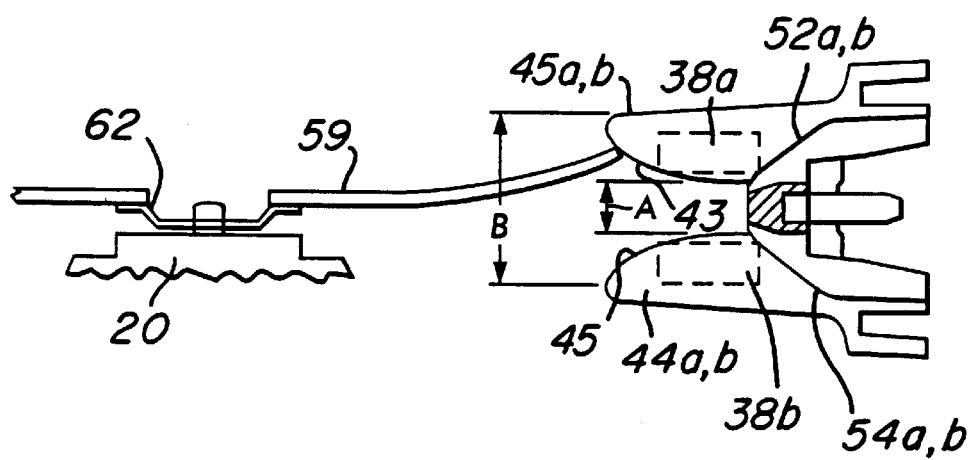
FIG. 4B is a side view of the load ramp member of FIG. 2, illustrating the media capture feature of the present invention.

FIG. 2 is an enlarged view of the disk drive 10 of FIG. 1 showing a portion of the outer return path assembly 34 through which upper and lower load beams 46a, 46b of the carriage assembly 32 extend. A load ramp member 40 is attached to the outer return path assembly 34, which is preferred, although the load ramp member 40 may be attached to any other suitable structure within the disk drive 10. Preferably, the load ramp member 40 is formed of a thermoplastic material. In the preferred embodiment, the load ramp member is formed of polycarbonate loaded with a small percentage of PTFE (as a lubricant). However, any suitable material may be employed. Referring to FIGS. 2, 3, and 4B, the load ramp member is attached to the outer return path assembly 34 by a series of snaps 58a, 58b, 60a, and 60b. Further details of the structure of the outer magnet return path assembly 34 and inner magnet return path members 36a, 36b can be found in commonly assigned, application Ser. No. 08/0881,805, entitled "Laminated Steel Return Path with Actuator Support Features" (Attorney Docket: IOM-9508), which is hereby incorporated by reference in its entirety.

The load ramp member 40 has a first pair of opposed ramp surfaces 52a, 54a located on one side of the load beams, and a second pair of opposed ramp surfaces 52b, 54b located on the other side of the load beams 46a, 46b. A wing 48 is attached to the upper load beam 46a, which rides over the ramped surfaces 52a and 52b. A similar wing 50 is attached to the lower load beam 46b, which rides over the ramped surfaces 54a and 54b. After a disk cartridge has been inserted into the disk drive 10, the carriage assembly of the disk drive moves forward toward the disk cartridge. As the carriage assembly moves forward, the wings 48, 50 on the load beams 46a, 46b ride down the respective ramp surfaces 52a,b and 54a,b to bring the respective read/write heads 38a, 38b into engagement with the respective surfaces of the storage medium within the disk cartridge. When the cartridge is to be ejected, the carriage assembly 32 moves rearwardly to a retracted position. As the carriage assembly 32 moves rearwardly, the wings 48, 50 ride back up the ramp surfaces 52a,b and 54a,b to lift the respective heads 38a, 38b off the surfaces of the storage medium.

Integral Lift Wings

In accordance with one aspect of the present invention, the wings 48, 50 are formed integrally with their respective load beams 46a, 46b. In the preferred embodiment, the load beams 46a, 46b and their respective wings 48, 50 are formed of metal. The surfaces of the lift wings 48, 50 that contact the respective ramped surfaces 52a, 52b and 54a, 54b are rounded. Preferably, the load beams 46a, 46b with their integral lift wings 48, 50 are formed of stainless steel, and are formed by first etching a blank of the load beam and integral wing from a thin sheet of stainless steel, and then stamping them in a conventional manner to achieve the desired shaping illustrated in the Figures. Etching a stainless steel sheet to form the load beams is preferably, as tolerances can be more tightly controlled. Alternatively, the load beams can be formed solely by a stamping process, although this is less preferable. By forming the wings integrally with the load beams, the number of parts is reduced, resulting in a cost reduction. Additionally, the disk drive assembly process is simplified, as the step of attaching a separate wing to each load beam is eliminated.

Disk Cartridge Media Capture

Because the disk drive 10 must have a length no greater than 135 mm in order to fit within most laptop and notebook computer peripheral drive bays, there is not sufficient space to retract the read/write heads far enough to clear the edge of the storage medium within the disk cartridge. Thus, in their parked position, the heads will be located over a portion of the edge of the storage medium. Because the vertical position of the media may vary during disk insertion, due to a number of considerations, it is possible that, without some form of protection, the edge of the media might ride up over one of the read/write heads, possibly causing damage to the fine wire (sometimes referred to as a service loop) that runs from the head to the drive electronics along the edge of the load beam. This problem is illustrated pictorially in FIG. 4A. As shown, the disk-shaped storage medium 59, which is attached to a hub 62 within a disk cartridge (not shown), may be vertically out of position during insertion of the cartridge such that it rides up over one of the read/write heads, potentially causing damage to the service loop of that head.

According to a preferred embodiment of one aspect of the present invention, the load ramp member 40 has a pair of opposed projections 42a, 44a and 42b, 44b disposed Referring to FIG. 4B, these projections 42a,b and 44a,b shield the read/write heads 38a, 38b of the disk drive 10 from the edge of the media 59 during disk cartridge insertion, by providing opposed angled surfaces 43, 45 that deflect the edge of said disk-shaped storage medium 59 during insertion and capture the edge of the storage medium between them, thus preventing the edge of the medium 59 from contacting the heads. In the preferred embodiment, the dimensions A and B of FIG. 4B are approximate 0.9 mm and 3.0 mm, respectively, although in other embodiments, these dimensions may be different. While in the preferred embodiment the projections 42a, 44a, 42b, and 44b, are formed as part of the load ramp member 40, they can also be formed separately, or with other structure within the disk drive.

Wing Barrier Preventing Lateral Movement

Because laptop and notebook computers are often subjected to shock, for example, when they are accidentally dropped or jolted, there is a chance that the read/write head carriage assembly may move laterally and vertically within the drive. Excessive movement of the carriage assembly 32 can cause damage to the read/write heads 38a, 38b. For example, excessive lateral movement of the load beams 46a, 46b could cause the read/write heads 38a, 38b to contact the sides of the ramp surfaces of the load ramp member 40, potentially causing severe damage.

Figure 5:
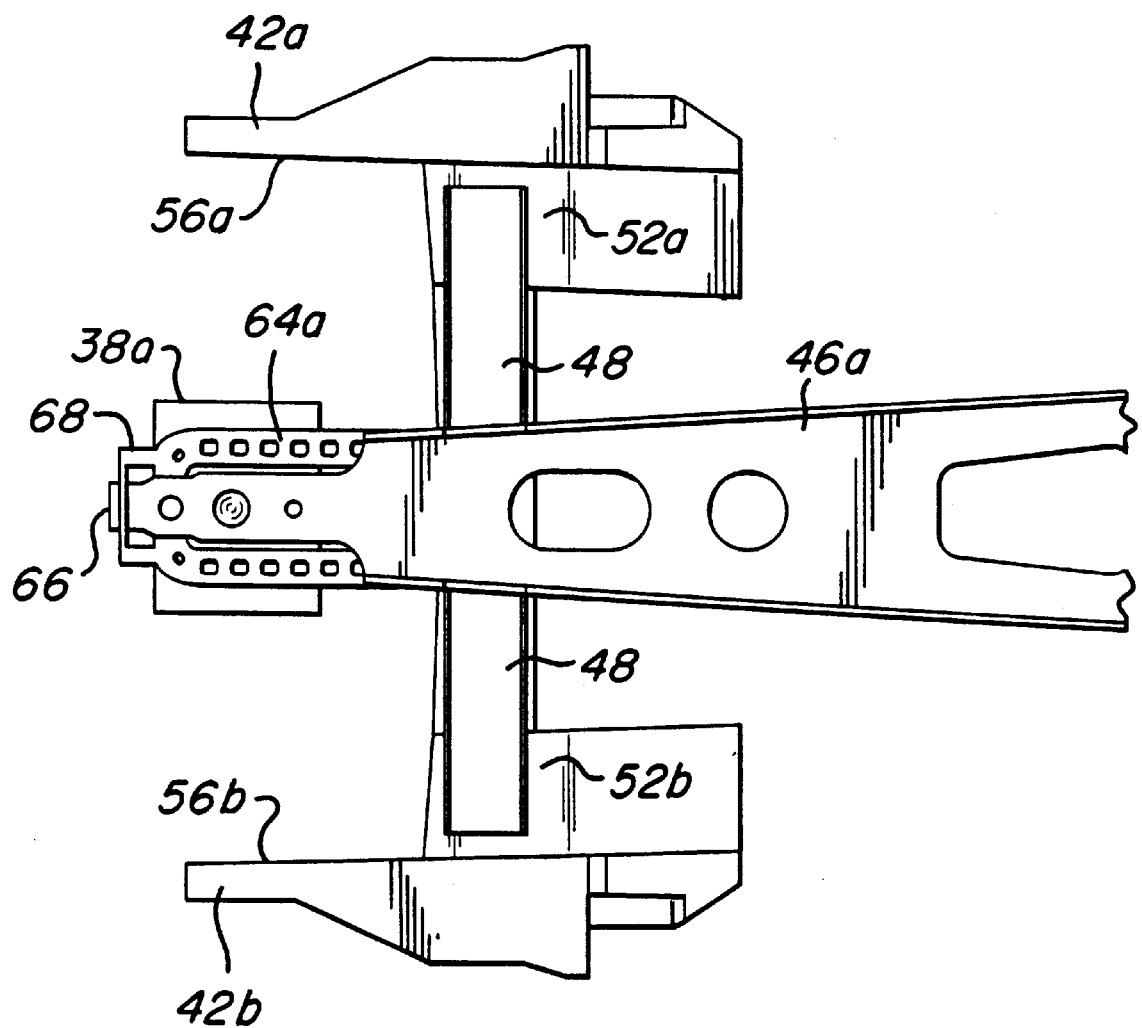
FIG. 5 is a top view of the actuator carriage assembly and load ramp member.

Referring to FIG. 5, according to a preferred embodiment of another aspect of the present invention, barriers 56a and 56b are placed opposite the respective ends of the wings 48, 50 of the load beams 46a, 46b, to prevent excessive lateral displacement of the beams. In the present embodiment, the barriers 56a and 56b are formed as part of the projections 42a, 44a and 42b, 44b. In FIG. 5, it can be seen that the barriers 56a and 56b will prevent excessive lateral displacement of the wings 48, 50, preventing the heads 38a and 38b from contacting any structure of the load ramp member 40.

The barriers 56a and 56b must be far enough apart to provide some clearance for the wings 48, 50, so that contact between them during normal operation of the carriage assembly 32 is avoided, but they must be close enough together to prevent the ends of the wings 48, 50 from sliding off their respective ramp surface 52a, 52b, 54a, 54b. In the present embodiment, the span of each wing 48, 50 is approximately 6.6 mm, and the distance between the barriers 56a and 56b is approximately 7.19 mm. The ramp surfaces 52a and 52b (as well as lower ramp surfaces 54a and 54b) have a span of approximately 4.4 mm between them. The width of each ramp surface 52a, 52b, 54a, 54b is approximately 1.4 mm.

Gimbal Anti-Shock Feature

Figure 6:
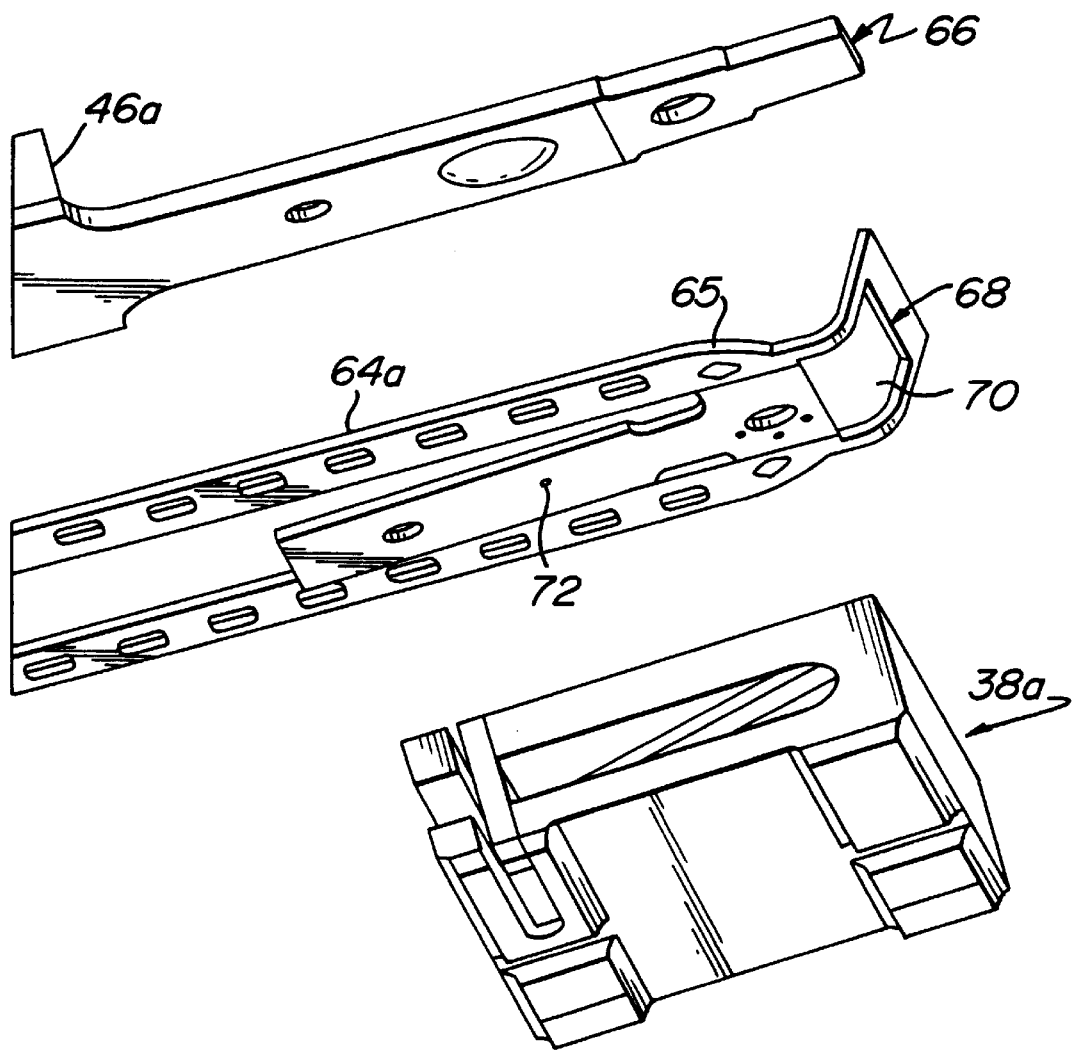
FIG. 6 is an exploded assembly view of a head gimbal assembly in accordance with a preferred embodiment of another aspect of the present invention.

FIG. 6 is an exploded view of a portion of the carriage assembly 32. In particular, the upper load beam 46a, upper gimbal 64a, and upper read/write head 38a are shown. The gimbal 64a is preferably formed of stainless steel, and can be formed using the same etching and stamping process described above for the load beams 46a, 46b and integral wings 48, 50. Additional details of the structure of the carriage assembly 32 can be found in commonly assigned, application Ser. No. 08/866,168, filed May 30, 1997, entitled "Flexured Mounting System for Friction Reduction and Friction Linearization in Linear Actuator for Disk Drive" (Attorney Docket: IOM-9514), which is hereby incorporated by reference in its entirety.

Figure 7:
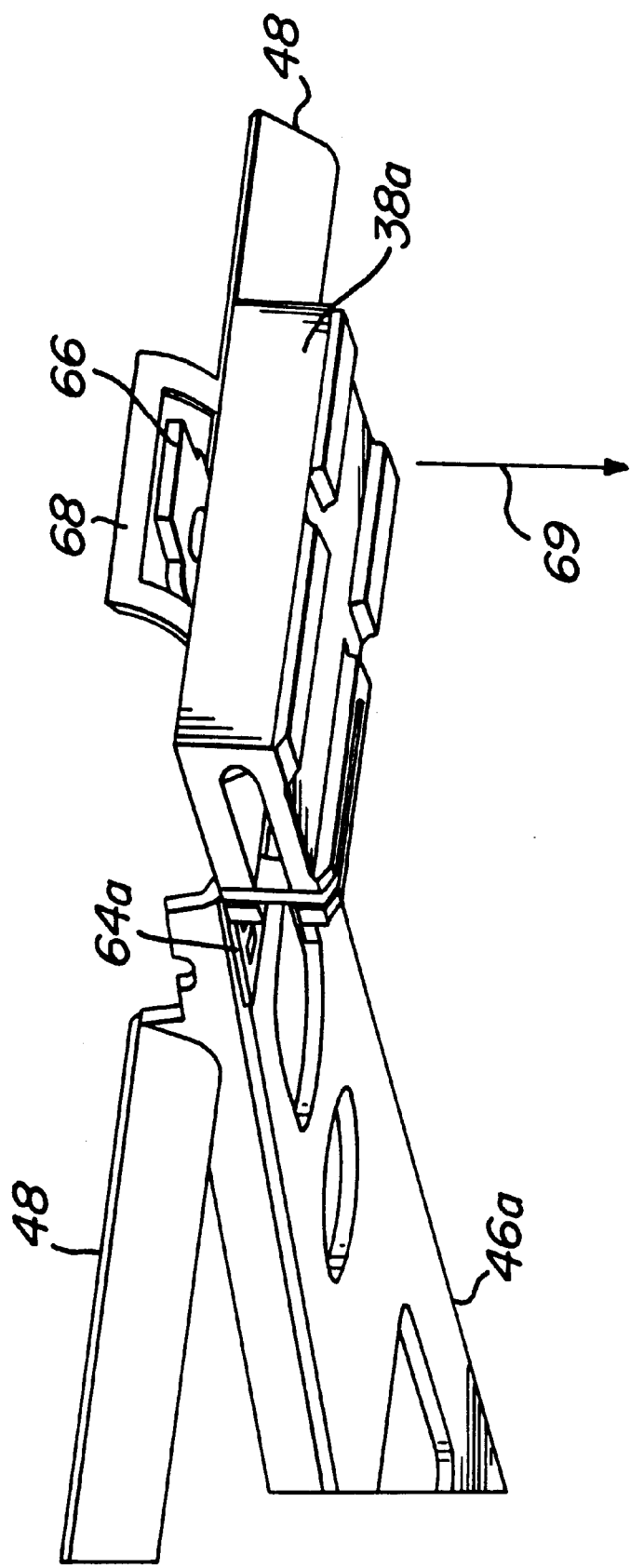
FIG. 7 is a perspective view of the head gimbal assembly of FIG. 6.

A proximal end (not shown) of the gimbal 64a is attached to the load beam 46a in a conventional manner. The opposite end 65 of the gimbal is not attached to the load beam 46a, and thus is free to move as the gimbal 64a bends under force. The read/write head 38a is attached to a flexure 72 of the gimbal 64a, also in a conventional manner. FIG. 7 shows the completed assembly. Because the end 65 of the gimbal 64a is free to move, excessive shock on the carriage assembly 32 along the vertical axis can cause the gimbal 64a and head 38a to bend downwardly (in the direction of arrow 69). Excessive bending of the gimbal 64a in this direction can cause plastic deformation in the gimbal 64a, resulting in permanent damage.

In accordance with a preferred embodiment of an additional aspect of the present invention, the load beam 46a has a tab 66 extending distally from its distal end, and the gimbal 64a has a restraining member 68 at its distal end. The restraining member 68 has a window 70 through which the tab 66 of the load beam 46a extends. Thus, the restraining member 68 captures the tab 66 through window 70. As can be appreciated from FIGS. 6 and 7, the restraining member 68 will contact the tab 66 of the more rigid load beam 46a when the carriage assembly 32 undergoes shock along its vertical axis, thus preventing excessive vertical movement of the gimbal. This prevents plastic deformation of the gimbal under extreme shock.

In the present embodiment, the restraining member is formed integrally with the gimbal, and is bent up from the plane of the gimbal. Additionally, the restraining member is generally rectangular in the preferred embodiment. It is understood, however, that the restraining member may have other shapes, such as oval or circular (not shown). Additionally, in other embodiments, the restraining member may be a separate piece that is mounted to the distal end of the gimbal, as opposed to the integral structure disclosed herein.

Alternate Load Ramp Member Attachment

Figure 8:
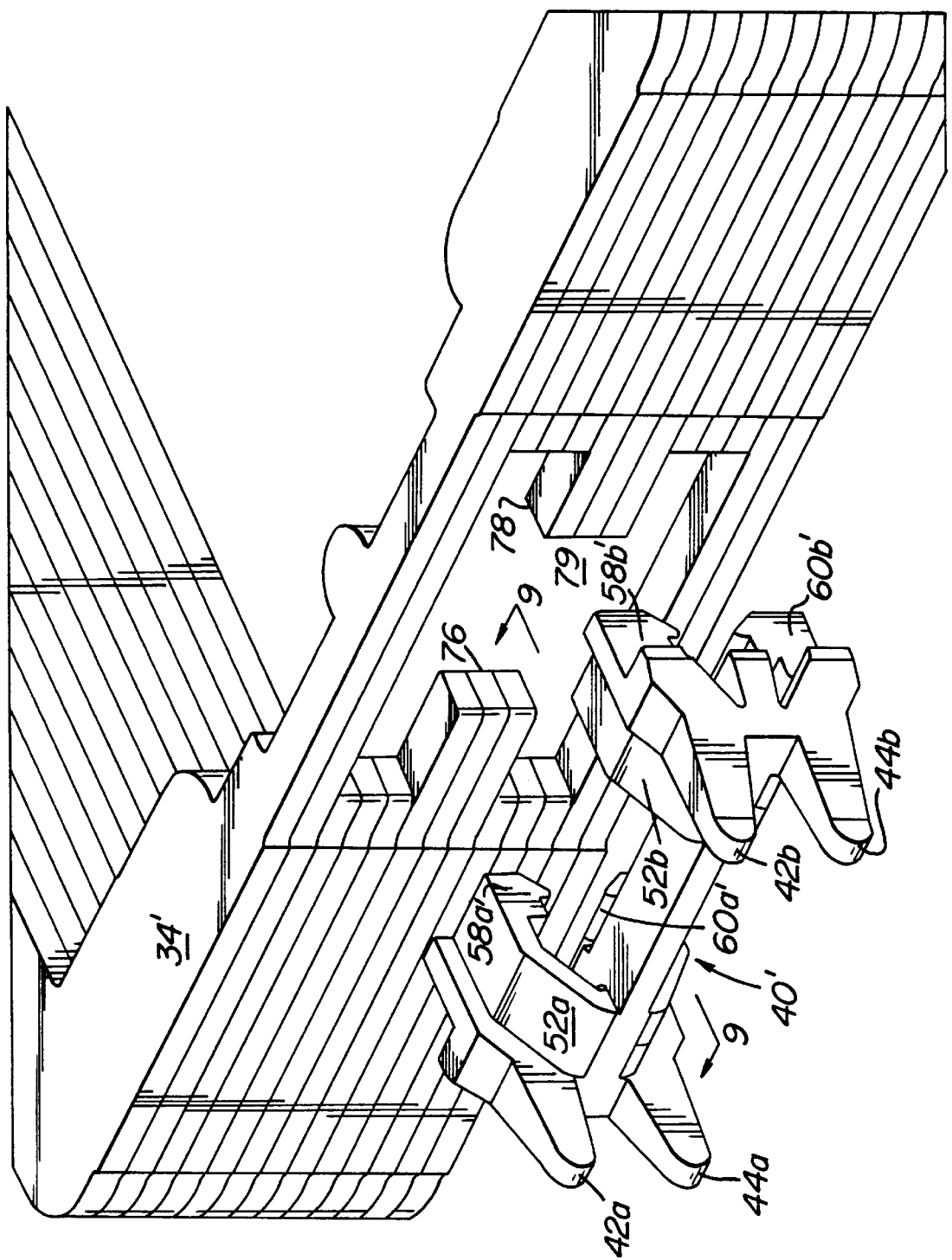
FIG. 8 is a perspective view of another embodiment of a load ramp member in accordance with the present invention.

FIG. 8 shows an alternate embodiment of a load ramp member 40', in accordance with yet another aspect of the present invention. In this embodiment, the load ramp member 40' has two pairs of opposed snaps 58a', 60a' and 58b', 60b' extending from the side of the member 40' opposite the protrusions 42a, 44a and 42b, 44b. In this embodiment, each pair of opposed snaps 58a', 60a' and 58b', 60b' of the load ramp member 40' is snap fit to a respective beam 76, 78 formed in an opening 79 in the outer return path assembly 34'.

Figure 9:
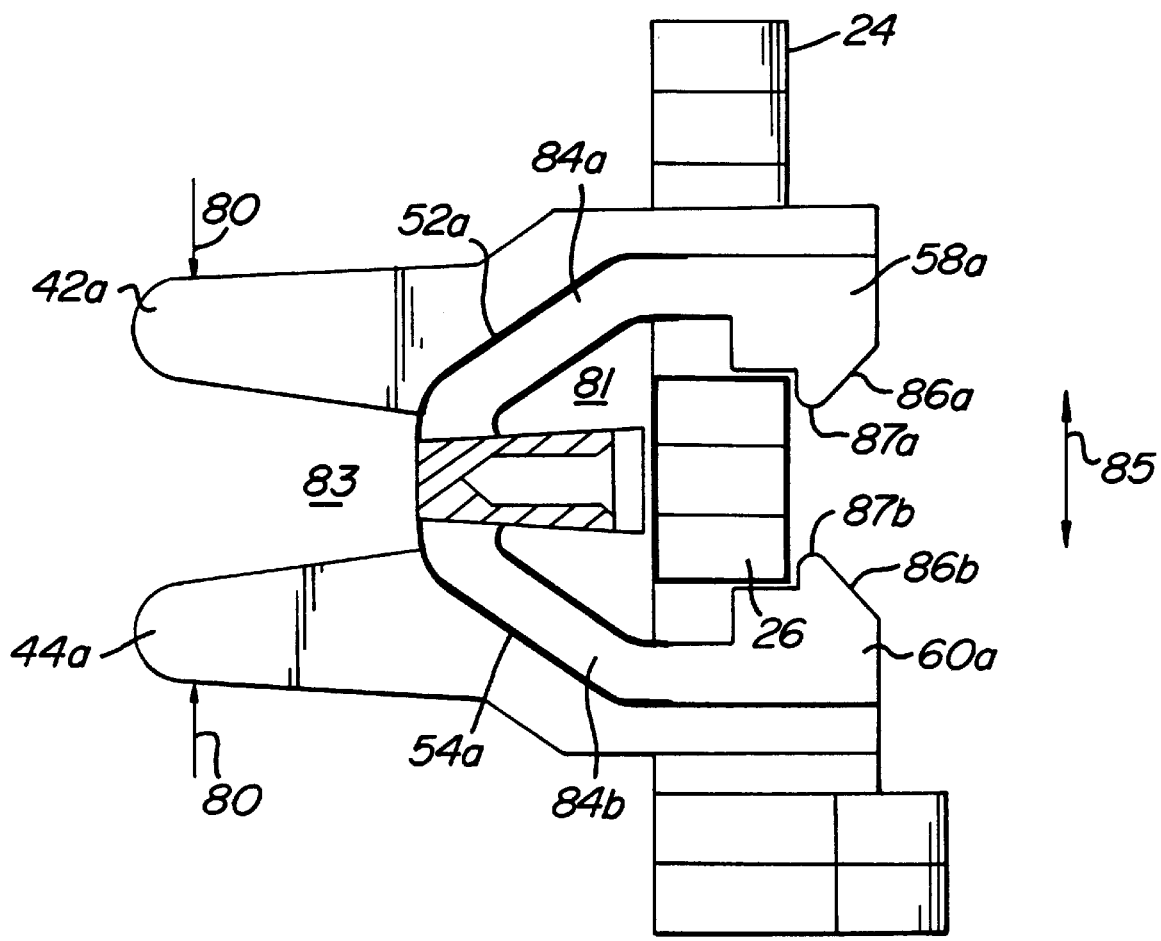
FIG. 9 is a side view of the load ramp member of FIG. 8, illustrating its attachment to an outer return path structure.

Referring to FIGS. 8 and 9, the load ramp member 40' has a hollow core 81 between each pair of opposed snaps 58a', 60a' and 58b', 60b', and similarly has a hollow portion 83 between each pair of opposed protrusions 42a, 44a and 42b, 44b. The body of the load ramp member 40' and its hollow core 81 form upper and lower hinges 84a and 84b, the outlines of which are shown in heavy lines. When pressure is applied to the opposed protrusions 42a, 44a in the direction of arrows 80, the hinges 84a and 84b flex, causing the opposed snaps 58a', 60a' to spread apart in the direction of double arrow 85. This ability of the load ramp member 40' can be used to facilitate both attachment and removal of the load ramp member from the beams 76, 78 of the outer magnetic return path 34'. Force can be applied to the opposed protrusions 42a, 44a and 42b, 44b (in the direction of arrows 80) by a user's fingers or by a suitable fixture or tool.

Referring to FIG. 9, in order to facilitate attachment of the load ramp member 40' to the beams 76, 78 of the outer magnetic return path 34', angled surfaces 86a and 86b are provided on the inner edges of the upper and lower snaps 58a' and 60a' (as well as on snaps 58b' and 60b' not shown in this Figure). As the load ramp member 40' is pushed onto the beams 76, 78 during assembly, the angled surfaces 86a and 86b (on both pairs of opposed snaps 58a', 60a' and 58b', 60b') will engage the respective corners of the beams 76, 78. Referring in particular to the snaps 58a', 60a' and beam 76 shown in FIG. 9, engagement of angled surfaces 86a, 86b with the corners of the beam 76, and continued force on the load ramp member 40' toward the outer magnet return path 34', will force the hinges 84a and 84b to flex apart until the inner most tips 87a, 87b of the opposed snaps 58a', 60a' clear the corners of the beam 76. The load ramp member 40' is then pushed further onto the respective beams 76, 78 until the tips 87a, 87b snap around the respective far corners of the beams, as shown in FIG. 9. In accordance with this aspect of the present invention, the load ramp member 40' can be easily removed, or detached, from the beams 76, 78 by applying pressure to the opposed protrusions 42a, 44a and 42b, 44b in the direction of arrows 80, causing the snaps 58a', 60a' and 58b', 60b' to spread apart far enough that the tips (e.g., tips 87a and 87b) of the snaps clear the upper and lower edges of the respective beams 76 and 78.

As the foregoing illustrates, the present invention is directed to apparatus for loading and unloading the read/write head(s) of a disk drive to and from a storage medium and for protecting the read/writes heads from damage due to shock and, in the case of removable cartridge disk drives, from damage that might result during media insertion. Other aspects of the present invention are directed to techniques for part reduction and for simplifying manufacturing. It is understood that changes may be made to the embodiments described above without departing from the broad inventive concepts thereof For example, while there are two pairs of opposed protrusions 42a, 44a and 42b, 44b, located at opposite ends of the load ramp member, in other embodiments there may be more or less numbers of opposed protrusions. Additionally, the various aspects of the present invention described herein may be employed in disk drives that include rotary read/write head actuators, as opposed to the linear actuator shown in the Figures. Also, the present invention is by no means limited to the particular shapes of the structures disclosed herein. Furthermore, while the load ramp member 40 of the present invention is shown, by way of example, as being attachable to an outer magnetic return path assembly of a disk drive, the load ramp member can be attached to any suitable structure with in the disk drive. For example, a special fixture for mounting the load ramp member could be formed within the disk drive. Accordingly, the present invention is not limited to the particular embodiments disclosed, but is intended to cover all modifications that are within the spirit and scope of the invention as defined by the appended claims.

What is claimed is:

1. A disk drive having an actuator for carrying a read/write head into engagement with a surface of a recording medium comprising:

an outer return path assembly, that is operative to communicate with the actuator to move the actuator with respect to the recording medium;

the actuator, comprising a carriage assembly comprising a load beam upon which said read/write head is mounted, the load beam having a pair of wings extending from the load beam that are operative to interface with at least one ramped surface, that is coupled to the outer return path assembly, to restrain vertical movement of the load beam;

a first barrier, coupled to the outer return path assembly and outboard of one of the pair of wings, to constrain lateral movement of said load beam to prevent damage to said read/write head when said disk drive undergoes shock; and a second barrier, disposed on the outer return path assembly and outboard of one of the pair of wings, to constrain lateral movement of said load beam to prevent damage to said read/write head when said disk drive undergoes shock.

2. The disk drive of claim 1 wherein the pair of wings are capable of contacting one of the first and the second barriers when said drive is shocked to constrain lateral movement of said load beam when said drive undergoes shock.

3. The disk drive of claim 1 wherein a first gap is formed between the first barrier and one of the wings and a second gap is formed between the second barrier and one of the wings during normal operation of the carriage.

4. The disk drive of claim 1 wherein the first and the second barriers are integrally formed with a pair of projections that, are coupled to the outer return path assembly, to capture an edge of the recording medium during normal insertion of the recording medium.

5. A disk drive having an actuator for carrying a read/write head into engagement with a surface of a recording medium comprising:

a carriage assembly comprising a load beam upon which said read/write head is mounted;

a wing extending from said load beam and having first and second ends;

a ramped surface on which said wing rides to position said read write head on the surface of said recording medium; and a pair of projections, disposed within the disk drive, that prevent the recording medium from contacting the read/write head upon insertion into the disk drive, the projections each having a surface that defines a barrier one of the barriers has been added, being disposed outboard of the first end of said wing, so that when the load beam moves in a first lateral direction the first end of the wing contacts the one of said barriers to constrain lateral movement of said load beam in the first lateral direction to prevent damage to said read/write head when said disk drive undergoes shock and the other of the barriers being disposed outboard of the second end of the wing, so that when the load beam moves in a second lateral direction the second end of the wing contacts the other of the barriers to constrain lateral movement of the load beam in the second lateral direction to prevent damage to said read/write head when said disk drive undergoes shock.

6. The disk drive of claim 2, wherein the actuator comprises a linear actuator.

7. The disk drive of claim 5, further comprising an outer return path, disposed in the disk drive, that communicates with the actuator to move the actuator, the pair of projections being coupled to the outer return path.

8. A disk drive that has an actuator assembly for cooperating with a removable data storage cartridge, comprising:

a platform;

a spindle motor assembly, movably coupled to said platform, for engaging and rotating a platter disposed in said cartridge;

an outer return path assembly, that is operative to communicate with the actuator assembly to move the actuator assembly with respect to the cartridge;

the actuator assembly, coupled to the platform, having a carriage assembly, said actuator assembly slidably supporting said carriage assembly, said actuator assembly comprising a load beam that has a pair of wings extending from the load beam that are operative to interface with at least one ramped surface, that is coupled to the outer return path assembly, to restrain vertical movement of the load beam and a read/write head coupled to the load beam;

a first barrier, coupled to the outer return path assembly and outboard of one of the pair of wings, to constrain lateral movement of said load beam to prevent damage to said read/write head when said disk drive undergoes shock; and a second barrier, coupled to the outer return path assembly and outboard of the other pair of wings, to constrain lateral movement of said load beam to prevent damage to said read/write head when said disk drive undergoes shock.

9. The disk drive of claim 8, wherein the actuator assembly comprises a linear actuator.

10. The disk drive of claim 8, wherein the first barrier is integrally formed with a first projection extending from the outer return path assembly, that prevents the read/write head from contacting the removable data storage cartridge when the removable data storage cartridge is inserted into the disk drive.

* * * * *